(12) United States Patent
Inoue et al.

(10) Patent No.: US 8,004,562 B2
(45) Date of Patent: Aug. 23, 2011

(54) DRIVING SUPPORT APPARATUS

(75) Inventors: Masayuki Inoue, Yokkaichi (JP); Hideo Kato, Yokkaichi (JP); Takanori Ito, Yokkaichi (JP); Goro Asai, Toyota (JP); Hideyuki Ide, Toyota (JP); Yasuhiko Yamamoto, Kariya (JP); Mitsutoshi Tamari, Kokubu (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 1539 days.

(21) Appl. No.: 11/189,796

(22) Filed: Jul. 27, 2005

(65) Prior Publication Data
US 2006/0022810 A1 Feb. 2, 2006

(30) Foreign Application Priority Data
Jul. 28, 2004 (JP) .................................. 2004-219991

(51) Int. Cl.
*H04N 7/18* (2006.01)
(52) U.S. Cl. ....................................................... 348/148
(58) Field of Classification Search .................. None
See application file for complete search history.

(56) References Cited

U.S. PATENT DOCUMENTS

| 6,785,404 | B1 * | 8/2004 | Shimazaki et al. | 382/104 |
| 2002/0123829 | A1 * | 9/2002 | Kuriya et al. | 701/1 |
| 2003/0009266 | A1 * | 1/2003 | Yamada et al. | 701/1 |
| 2003/0108222 | A1 * | 6/2003 | Sato et al. | 382/104 |

FOREIGN PATENT DOCUMENTS

| JP | A 64-014700 | 1/1989 |
| JP | A-2-36417 | 8/1990 |

* cited by examiner

*Primary Examiner* — Nhon T Diep
(74) *Attorney, Agent, or Firm* — Oliff & Berridge, PLC

(57) ABSTRACT

A driving support apparatus includes an imaging member taking an image corresponding to a vehicle peripheral area; a steering angle detecting member detecting a steering-wheel steering angle; a display member disposed in a vehicle interior to display the image; and a control member predicting a driving course of the vehicle according to the detected steering-wheel angle. The control member synthesizes a predicted driving course image relating to the predicted driving course. The control member superposes the predicted driving course image at a corresponding position of the image. The control member displays on the display member the image where at least one image, on which an index is marked at least at one height position, is superposed at least on the predicted driving course image and onto a side of the predicted driving course image while the control member displays the superposed image on the display member.

13 Claims, 4 Drawing Sheets

DRIVING SUPPORT APPARATUS

BACKGROUND OF THE INVENTION

1. Field of the Invention

The present invention relates to a driving support apparatus adapted to support a driver's driving by using images.

2. Description of the Related Art

A driving support apparatus of such a kind is, for example, an apparatus adapted to support a driver's driving of a vehicle by taking images of blind spot zones around the vehicle through the use of a camera and by displaying the taken images in a vehicle interior.

SUMMARY OF THE INVENTION

However, this driving support apparatus, which is adapted to only display the images taken by the camera as described above, has a problem in that it is difficult to understand the positional relation (for example, the distance) between a driving course of the vehicle, in which this driving support apparatus operates, and an obstacle (especially, an obstacle located at a certain height from the ground (that is, an obstacle, such as a bumper of another vehicle, floating from the ground) in the displayed image.

Accordingly, a problem to be solved by the invention is to provide a driving support apparatus enabled to facilitate understanding of the positional relation between a driving course of a vehicle, in which the driving support apparatus operates, and an obstacle, which relation is shown in the displayed image.

To solve the aforementioned problem, according to one aspect of the invention, there is provided a driving support apparatus for supporting a driving by using an image with respect to a driver, including: an imaging member taking an image corresponding to a predetermined vehicle peripheral area; a steering angle detecting member detecting a steering-wheel steering angle of a vehicle; a display member being disposed in a vehicle interior to display the image; and a control member predicting a driving course of the vehicle according to the steering-wheel angle detected by the steering-angle detecting member, the control member synthesizing a predicted driving course image relating to the predicted driving course, the control member superposing the predicted driving course image at a corresponding position of the image taken by the imaging member. The control member displays on the display member the image where at least one image, on which an index is marked at least at one height position, is superposed at least on the predicted driving course image and onto a side of the predicted driving course image while the control member displays the superposed image on the display member.

By thus configuration, the predicted driving course image, to which the pole image is added, is displayed by being superposed onto the taken image of the periphery of the vehicle. Thus, the driver can easily understand the positional relation (for example, the distance) between the driving course of the vehicle, which is provided with the driving support apparatus, and an obstacle (especially, an obstacle having a height from the ground) in the displayed image.

In addition, the index is marked on the pole image at least at one height position. Thus, plural height references can be provided in the displayed image by using the top position of the pole image and the index. For example, the sense of distance concerning the distance between the vehicle, in which the driving support apparatus operates, and each of various kinds of else vehicles differing from one another in height from the ground can easily be obtained according to the displayed image.

According to another aspect of the invention, there is provided A driving support apparatus for supporting a driving by using an image with respect to a driver, including: an imaging member taking an image corresponding to a predetermined vehicle peripheral area; a steering angle detecting member detecting a steering-wheel steering angle of a vehicle; a display member being disposed in a vehicle interior to display the image; and a control member predicting a driving course of the vehicle according to the steering-wheel angle detected by the steering-angle detecting member, the control member synthesizing a predicted driving course image relating to the predicted driving course, the control member superposing the predicted driving course image at a corresponding position of the image taken by the imaging member. The control member displays on the display member the image where at least one image, on which a color or a pattern is changed at a boundary that is provided at least at one height position, is superposed at least on the predicted driving course image and onto a side of the predicted driving course image while the control member displays the superposed image on the display member.

According to the above-aspects of the invention, the predicted driving course image, to which the pole image is added, is displayed by being superposed onto the taken image of the periphery of the vehicle. Consequently, the driver can easily understand the positional relation (for example, the distance) between the driving course of the vehicle, which is provided with the driving support apparatus, and an obstacle in the displayed image.

According to the above-aspects of the invention, the color or the pattern is changed on the pole image at the boundary that is provided at least at one height position. Thus, plural height references can be provided in the displayed image by using the top position of the pole image and the position of the boundary of the display mode. For example, the sense of distance concerning the distance between the vehicle, in which the driving support apparatus operates, and each of various kinds of else vehicles differing from one another in height from the ground can easily be obtained according to the displayed image.

According to another aspect of the invention, the image is displayed in a three-dimensional pole shape.

According to the above-aspects of the invention, the pole image is displayed in a three-dimensional pole shape. Thus, the driver can easily understand that the pole image serves the index in the direction of height in the displayed image.

According to another aspect of the invention, the driving support apparatus further includes an input receiving member receiving operation input information for setting. The control member receives through the input receiving member operation input information for changing a display mode of the predicted driving course image and a display mode of the image. The control member causes the operation input information to affect a display of the predicted driving course image and the image.

According to the above-aspects of the invention, the condition set on the display mode, in which each of the predicted driving course image and the pole image is displayed, can be changed by the driver. Thus, the driver can change the display mode of each of the predicted driving course image and the pole image according to the level of his driving skill and to the status of use of the vehicle (including the situation of the periphery of the vehicle).

According to another aspect of the invention, at least one of a pattern, a color, and a shape of the image is changeable according to the operation input information.

According to the above-aspects of the invention, at least one of the pattern, the color, and the shape of the pole image is enabled to be changed according to the operation input information. Thus, this apparatus of the invention can flexibly serve the driver's needs.

According to another aspect of the invention, at least one of an up-down dimension of the image in the displayed image and the height position, at which the index or the boundary is provided, is changeable according to the operation input information.

According to the above-aspects of the invention, at least one of the up-down dimension of the pole image in the displayed image and the height position, at which the index or the boundary is provided, can be changed according to, for instance, the height from the ground of the else vehicle serving as an obstacle, or to the positional relation between the vehicle, in which the driving support apparatus operates, and the pole image in the displayed image. Consequently, the sixth driving support apparatus can provide a supporting image that better conforms the level of the driver's driving skill and the status of use of the vehicle (including the situation of the periphery of the vehicle).

According to another aspect of the invention, positional relation of the vehicle with respect to the predicted driving course image and the image in the displayed image is changeable according to the operation input information.

According to the above-aspects of the invention, the positional relation between the vehicle, in which this driving support apparatus operates, and each of the substantially line-like predicted driving course image and the pole image can be changed. Thus, this driving support apparatus can provide a supporting image that better conforms the level of the driver's driving skill and the status of use of the vehicle (including the situation of the periphery of the vehicle).

According to another aspect of the invention, the driving support apparatus further includes an obstacle detecting member detecting an obstacle that is present in an imaging region of the imaging member. In a case where the obstacle detecting member detects that an obstacle is present at a position corresponding to the image, the control member changes a display condition of the image or causes the display member to display a predetermined warning.

According to the above-aspects of the invention, in a case where the obstacle detecting member detects that an obstacle is present at a position corresponding to the pole image, the display condition of the pole image is changed. Alternatively, the predetermined warning is displayed. Thus, the driver can surely recognize the presence of the obstacle on the driving course or in the periphery thereof.

According to another aspect of the invention, the predicted driving course image includes: a steering-angle steered driving course image corresponding to the steering-wheel angle detected by the steering-angle detecting member; and a straight driving course image representing a predicted driving course in a case where the steering-wheel angle is zero.

According to the above-aspects of the invention, the steering-angle steered driving course image, which corresponds to the steering-wheel steering angle, and the straight driving course image, which represents the predicted driving course in a case where the steering angle is zero, are displayed. Thus, the driver can more easily recognize the driving course of the vehicle by referring to both these images.

According to another aspect of the invention, the imaging member takes an image of an imaging region located obliquely frontwardly from an assistant driver's seat of the vehicle.

According to the above-aspects of the invention, a supporting image is corresponds to the region located obliquely frontwardly from an assistant driver's seat of the vehicle.

According to another aspect of the invention, the imaging member takes an image of an imaging region located frontwardly from the vehicle.

According to the above-aspects of the invention, a supporting image is corresponds to the region located frontwardly from the vehicle.

According to another aspect of the invention, the imaging member takes an image of an imaging region located laterally from the vehicle.

According to the above-aspects of the invention, a supporting image is corresponds to the region located laterally from the vehicle.

DESCRIPTION OF THE PREFERRED EMBODIMENTS

First Embodiment

Figure 1:
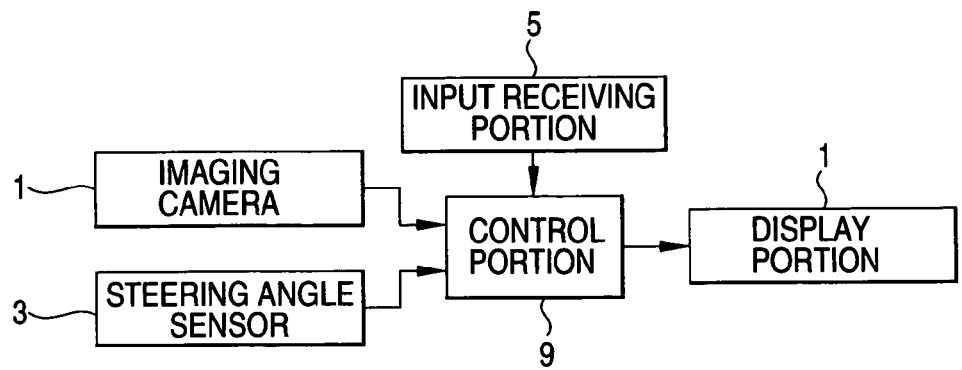
FIG. 1 is a block diagram illustrating a driving support apparatus according to a first embodiment of the invention.

FIG. 1 is a block diagram illustrating a driving support apparatus according to a first embodiment of the invention. As shown in FIG. 1, this driving support apparatus has an imaging camera (an imaging member) 1, a steering angle sensor (a steering-angle detecting member) 3, an input receiving portion (an input receiving member) 5, a display portion (a display member) 7, and a control portion (a control member) 9. The driving support apparatus supports a driver's driving by using images. This embodiment is adapted to provide, especially, a supporting image of the periphery of an assistant-driver's seat side corner part 11 (see FIG. 2), which is taken when a vehicle is forwardly moved. Incidentally, in the present specification, for simplicity of description, the following description is given by assuming that the vehicle is a right hand drive car, and that the assistant-driver's seat side is the left side in the frontward direction of the vehicle.

Figure 2:
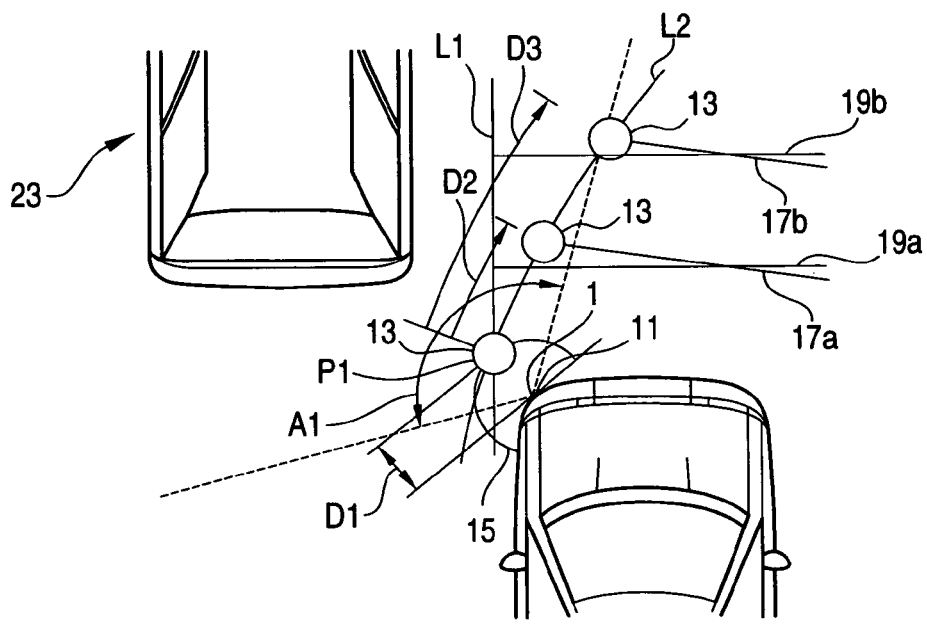
FIG. 2 is an explanatory diagram illustrating the positional relation between supporting synthetic images in an imaging range of the driving support apparatus shown in FIG. 1.
Figure 3:
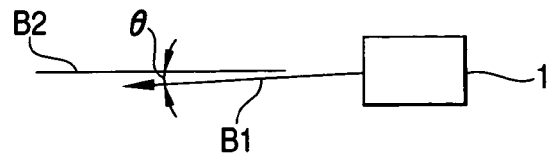
FIG. 3 is a diagram illustrating an imaging direction of an imaging camera with respect to a horizontal direction.

The imaging camera 1 is installed at the left-side corner part 11 of the front end portion (for example, a corner part of the bumper) of the vehicle, as viewed in FIG. 2. The imaging camera 1 takes an image of an imaging region A1 located leftwardly obliquely and frontwardly to the vehicle. The imaging direction B1 of the imaging camera 1 is set so that an angle θ formed between the imaging direction B1 and a horizontal direction B2 is within a range of plus or minus substantially 20 degrees with respect the horizontal direction B2, as shown in FIG. 3. Thus, the imaging direction B1 is set to be substantially horizontal, with the intension of enabling understanding of the positional relation (including the distance) between a driving course of a vehicle, in which this driving support apparatus operates, and an obstacle, which relation is shown in a supporting image 11 (see FIG. 4) that is an image displayed by effectively utilizing images 13*a* to 13*c* (herein after referred to as "pole images") and height indexes indicated by graduation lines (or indexes) 21 respectively put thereon.

The steering angle sensor 3 detects a leftward or rightward steering angle of the steering wheel and subsequently provides information, which represents the detected steering angle, to the control portion 9.

The input receiving portion 5 is configured to have an operation part adapted to receive operation input information inputted by a driver to this driving support apparatus. For instance, operation input information representing an operation of changing a display mode, in which the pole images 13*a* to 13*c* (to be described later) are displayed, is received through this input receiving portion 5.

The display portion 7 is installed in the periphery (for example, an instrument panel portion) of a driver's seat in a vehicle interior and displays an image under the control of the control portion 9.

The control portion 9 predicts a driving course of the vehicle according to the steering-wheel steering angle detected by the steering angle sensor 3. Then, the control portion 9 superposes an image, which is synthesized according to the predicted driving course, onto the image taken by the imaging camera 1. Thus, the control portion 9 causes the display portion 7 to display a supporting image 11 shown in FIG. 4.

More specifically, the supporting image 11 includes a straight driving course image L1 and a steering-angle steered driving course image L2, which are substantially line-like images relating to the predicted driving courses of the vehicle, and also includes plural (for instance, three) pole images 13*a* to 13*c*, and plural distance index images 15, 17*a*, 17*b*, 19*a*, and 19*b* as the synthetic images. Among these synthetic images, the straight driving course image L1 and the steering-angle steered driving course image L2 correspond to the predicted driving course images according to the invention. The displaying positions of these synthetic images L1, L2, 13*a* to 13*c*, 15, 17*a*, 17*b*, 19*a*, and 19*b* on the supporting image 11 correspond to the positions respectively designated by reference characters in the actual imaging region A1 shown in FIG. 2.

The straight driving course image L1 corresponds to a driving course on which the vehicle moves straight frontwardly in a case where the steering-wheel steering angle is 0. The straight driving course image L1 is set to pass through a position on the supporting image, which position corresponds to a reference position P1 set in the periphery or the vicinity of the corner part 11 of the vehicle, and to extend like a line along a straight driving direction of the vehicle. This straight driving course image L1 shows a driving course in a case where the vehicle tentatively moves straight. The reference position P1 is set at a place located at a distance D1 (for example, about 30 cm) obliquely leftwardly frontwardly from the corner part 11.

The steering-angle steered driving course image L2 corresponds to a driving course predicted according to an actual steering-wheel steering angle. The steering-angle steered driving course image L2 passes through a position on the supporting image 11, which position corresponds to the reference position P1, and is set to extend like a line along the driving course predicted according to the steering-wheel steering angle. This steering-angle steered driving course image L2 shows an actual predicted driving course corresponding to the steering-wheel steering angle.

In the embodiment, the steering-angle steered driving course image L2 is formed in a one-dimension such as a line. However, the steering-angle steered driving course image L2 may be formed in a two-dimension such as a plane where the line moves along the line along the driving course predicted according to the detected steering-wheel steering angle.

The pole images 13*a* to 13*c* have three-dimensional pole shapes (in this case, cylindrical shapes) longitudinally extending in the supporting image 11 and are displayed to be erected at predetermined intervals in the steering-angle steered driving course image L2. The pole image 13*a* (or the reference position P1) placed most near to the vehicle, in which the driving support apparatus operates, is erected at a place corresponding to the reference position P1 in the supporting image 11. The subsequent pole image 13*b* and the further subsequent pole image 13*c* are respectively erected at places, which are located at distances D2 and D3 (for example, about 1 m and about 2 m) from this vehicle (or the reference position P1) along the predicted driving course thereof. Each of the display sizes of the pole images 13*a* to 13*c* is changed according to the corresponding distance from this vehicle.

Also, a graduation line 21 serving as a height reference is marked at least at a certain height on each of the pole images 13*a* to 13*c*.

Incidentally, the up-down dimension E1 of each of the pole images 13*a* to 13*c* is set as follows. That is, the up-down dimension E1 of each of the pole images 13*a* to 13*c* is set to correspond to the up-down dimension of an image of a corresponding pole of a predetermined height (for instance, about 50 cm) erected at a position, which corresponds to the display position of this pole in the supporting image 11, in the actual imaging region a1, which dimension is obtained when the image of this pole is taken. In association with this, the height position E2 of the graduation line 21 is set to correspond to a height position (for instance, about 30 cm from the ground) thereof in the actual imaging region A1. For example, the height position of each of the tops of the pole images 13*a* to 13*c* may be set at a height from the ground (especially, that of a back bumper part) of a car of the kind that has a large height from the ground, such as a SUV (Sport Utility Vehicle). Also, the height position of the graduation line 21 may be set at a height from the ground (especially, that of a back bumper part) of an ordinary vehicle, such as a sedan.

The distance index image 15 is a line-like image used for displaying a position that is apart at a distance D1 from the left-side corner part 11 of the front end portion of the vehicle.

The distance index images 17*a* and 17*b* are line-like images displayed at positions in the supporting image 11, which respectively correspond to places located at distances D2 and D3 along the predicted driving course frontwardly from this vehicle, to extend substantially laterally. The distance index images 19*a* and 19*b* are line-like images displayed at positions in the supporting image 11, which respectively correspond to places located at distances D2 and D3 along the predicted driving course frontwardly from this vehicle (or the reference position P1), to extend substantially laterally.

Among these synthetic images, the steering-angle steered driving course image L2, the pole images 13a to 13c, and the distance index images 17a and 17b are adapted so that the display (for example, the position or the shape) of each thereof in the supporting image 11 is changed according to change in the predicted driving course corresponding to the steering-wheel steering angle. When the steering-wheel steering angle is 0, the steering-angle steered driving course image L2 is superposed on the straight driving course image L1. The distance index images 17a and 17b are superposed on those 19a and 19b, respectively.

Different patterns and colors are set at the synthetic images L1, L2, 13a to 13c, 15, 17a, 17b, 19a, and 19b, respectively, so as to discriminate among the synthetic images. For instance, the straight driving course image L1, and the distance index images 19a and 19b are displayed in green. The pole images 13a to 13c, the steering-angle steered driving course image L2, and the distance index images 17a and 17b are displayed in yellow. The distance index image 15 is displayed in red. The graduation lines 21 of the pole images 13a to 13c are displayed in green.

The set display modes of each of the synthetic images L1, L2, 13a to 13c, 15, 17a, 17b, 19a, and 19b can be changed by inputting the operation input information through the input receiving portion 5. The control portion 9 is adapted to perform a process of changing the set mode.

More specifically, the conditions set concerning the pattern (for instance, the presence/absence of a pattern, and the configuration of a pattern), those set on the shape (for example, which of a cylindrical shape and a rectangular column shape is employed), those set on the color of each of the pole images 13a to 13c, and those set on the color of the graduation lines can be changed. Also, the conditions set on the color, those set on the type of the line (for instance, a solid line or a chain line) and those set on the line thickness of the straight driving course image L1, the steering-angle steered driving course image L2, and the distance index images 15, 17a, 17b, 19a, and 19b can be changed. The conditions set on the up-down dimensions E1 of the pole images 13a to 13c in the supporting image 11 and those set on the height positions E2 of the graduation lines 21 can be changed.

Also, the conditions set on the display positions of the synthetic images L1, L2, 13a to 13c, 15, 17a, 17b, 19a, and 19b in the supporting image 11 can be changed. For example, when the condition set on the distance between the reference position P1 corresponding to the pole image 13a and the vehicle, in which the driving support apparatus operates, is changed by a certain operation, the positional relation between the predicted driving course of this vehicle (for example, the predicted driving course of the left-side part of the front end portion of this vehicle) and each of the synthetic images L1, L2, 13a to 13c, 15, 17a, 17b, 19a, and 19b is automatically changed in response to the change of the condition. Further, when the display positions of the pole images 13b and 13c (or the distances D2 and D3 from this vehicle) are changed by a certain operation, the display positions of the distance reference images 17a, 17b, 19a, and 19b are automatically changed in an anterior-posterior direction.

Figure 4:
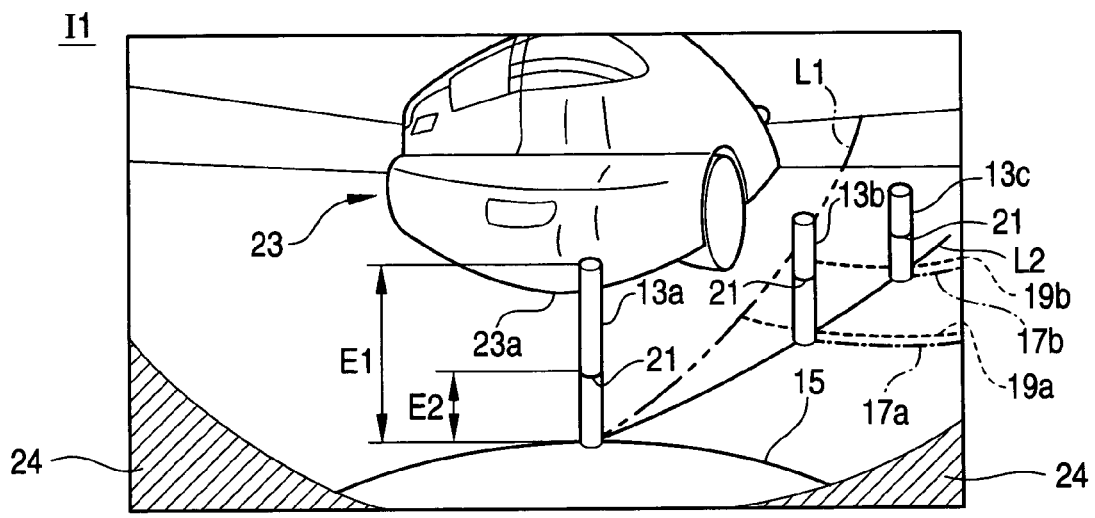
FIG. 4 is a diagram illustrating a supporting image displayed in the driving support apparatus shown in FIG. 1.

In such a driving support apparatus, for example, the supporting image 11 as shown in FIG. 4 is displayed in the display portion 7. FIG. 4 illustrates an example of the supporting image 11 in a case where this vehicle is parked beside (or passes through the side of) another (or an else) vehicle 23.

Incidentally, a zone designated by reference numeral 24 on a display screen shown in FIG. 4 is a black zone corresponding to an area placed outside the range of the taken image.

The relation between the driving course of the vehicle, in which the driving support apparatus operates, and the else vehicle 23 can roughly be understood from the relation between the image of the else vehicle 23 and each of the straight driving course image L1 and the steering-angle steered driving course image L2 in this supporting image 11. Also, an accurate sense of distance concerning the distance between the left-side part of the front end portion (that is, the corner part 11) of the vehicle, in which the driving support apparatus operates, and the else vehicle 23 can be obtained from the positional relation between the image of the else vehicle 23 and each of the straight driving course image L1 and the steering-angle steered driving course image L2 in this supporting image 11. For example, in a case where the pole image 13a overlaps with the image of the else vehicle 23 as shown in FIG. 4, it can be understood that the former vehicle and the else vehicle 23 are close to each other. Further, in a case where an image of the bottom part of the back bumper portion 23a of the else vehicle (for example, a sedan) 23 is displayed under the graduation line 21 marked on the pole image 13a, it can be understood that the distance between the else vehicle 23 and the corner part 11 of the vehicle provided with the driving support apparatus is less than the distance D1 corresponding to the reference position P1. In a case where the else vehicle 23 is of the type having a large height from the ground, for example, an SUV, the distance can be similarly grasped by employing the top part of the pole image 13a as a reference.

Also, the positional relation between the else vehicle 23 and each of positions on the driving course corresponding to the steering-wheel steering angle can accurately be understood from the positional relation between the else vehicle 23 and each of the pole images 13b and 13c, which are the second and third closest ones to the vehicle provided with the driving support apparatus, and the graduation lines 21 marked thereon.

As described above, according to this embodiment, the predicted driving course images L1 and L2, to which the pole images 13a to 13c are added, are displayed by being superposed on a taken image of the periphery of the left-side corner part 11 of the front end portion of a vehicle. Thus, a driver can easily understand the positional relation (for example, the distance) between the driving course of the vehicle provided with the driving support apparatus (especially, the course through which the left-side corner part 11 of the front end portion thereof) and an obstacle (especially, an obstacle having a height from the ground) in the supporting image 11.

Also, the graduation line 21 is marked at least at one place on each of the pole images 13a to 13c at a certain height. Thus, plural height references can be provided in the supporting image 11 by using the top positions of the pole images 13a to 13c and the gradual lines 21. For example, the sense of distance concerning the distance between the vehicle, in which the driving support apparatus operates, and each of various kinds of else vehicles 23 differing from one another in height from the ground can easily be obtained according to the supporting image 11.

Also, the pole images 13a to 13c are displayed in a three-dimensional pole shape. Thus, the driver can easily understand that the pole images 13a to 13c serve as indexes in the direction of height in the supporting image 11.

Also, the straight driving course image L1, which shows the predicted driving course in a case where the steering-wheel steering angle is 0, and the steering-angle steered driving course image L2, which shows the predicted driving course corresponding to the actual steering-wheel steering angle, are displayed as the predicted driving course images. Thus, the driver can easily recognize the driving course of the vehicle by referring to both the images L1 and L2.

Also, the distance index image 15, which shows a range of the predetermined distance D1 from the corner part 11 of the vehicle provided with the driving support apparatus in the supporting image 11, and the distance index images 17a, 16b, 19a, and 19b respectively corresponding to plural distance positions from this vehicle are displayed in the supporting image 11. Thus, the driver can easily understand the positional relation between this vehicle and the obstacle in the supporting image 11 (that is, obtains, especially, a sense of distance concerning the distance therebetween).

According to this embodiment, a driver can change the display mode of each of the synthetic images L1, L2, 13a to 13c, 15, 17a, 17b, 19a, and 19b according to the level of his driving skill and to the status of use of the vehicle (including the situation of the periphery of the vehicle).

Figure 5:
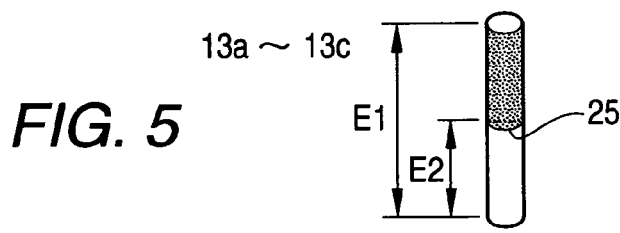
FIG. 5 is a diagram illustrating a modification of an image of a pole.

Incidentally, the pole images 13a to 13c displayed in the mode shown in FIG. 5 are considered as a modification thereof. In this modification of the pole images 13a to 13c shown in FIG. 5, a color or a pattern can be changed along a boundary 25, which is at least one height position (in FIG. 5, one height position). Even in this modification, the boundary 25, along which the color or the pattern is changed, in each of the pole images 13a to 13c may be a height reference.

Figure 6:
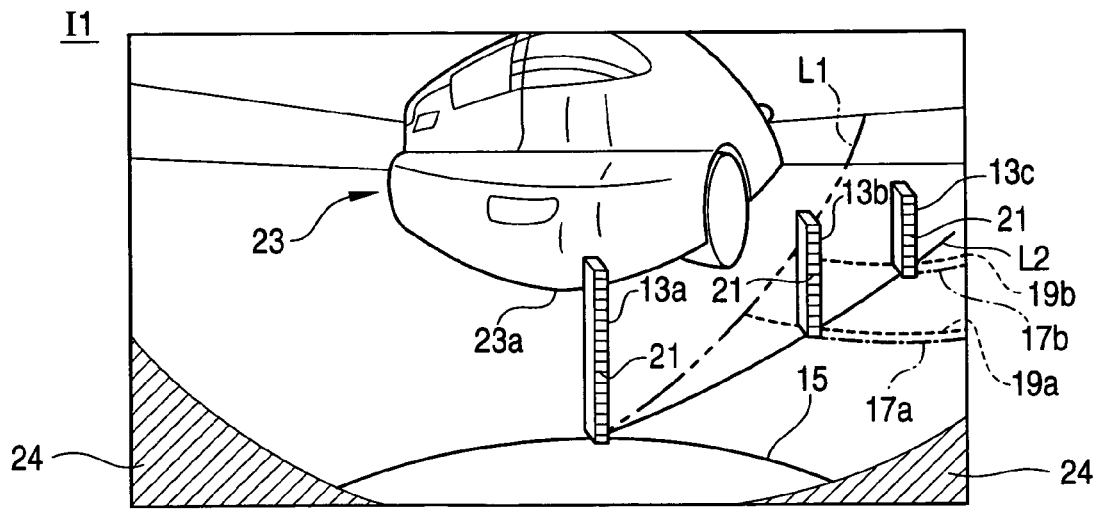
FIG. 6 is a diagram illustrating another modification of an image of each of the poles.

Additionally, the pole images 13a to 13c displayed in the mode shown in FIG. 6 are considered as another modification thereof. In the modification shown in FIG. 6, the pole images 13a to 13c are shaped like rectangular columns. Also, plural graduation lines 21 are marked in black like scale marks over the nearly entire length of each of the pole images 13a to 13c. Consequently, the graduation lines 21 can be utilized as the scale marks.

Second Embodiment

Figure 7:
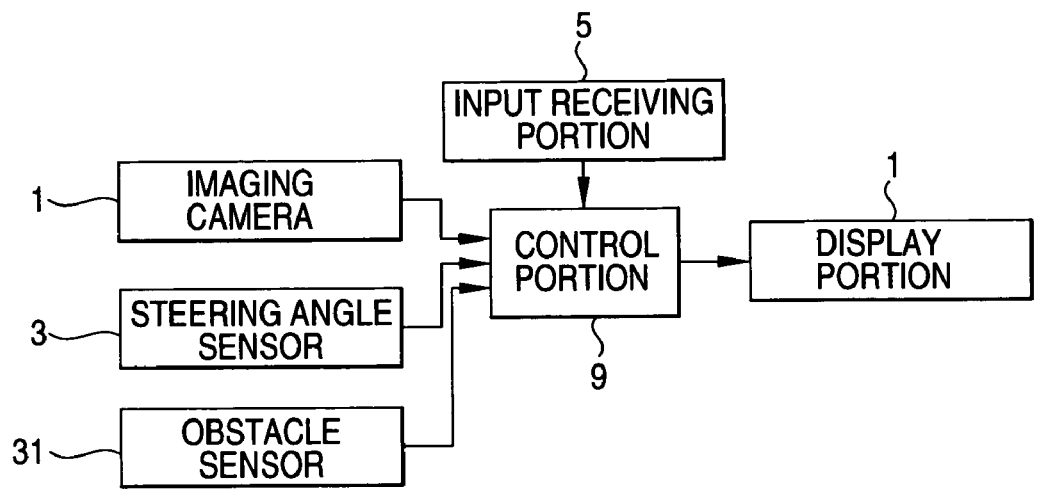
FIG. 7 is a block diagram illustrating a driving support apparatus according to a second embodiment of the invention.

FIG. 7 is a block diagram illustrating a driving support apparatus according to a second embodiment of the invention. The driving support apparatus according to this embodiment substantially differs from the aforementioned first embodiment only in an obstacle sensor (the obstacle detecting member) 31, which is added to the first embodiment, and in respects relating to the obstacle sensor. Thus, same reference characters designate corresponding parts of each of the embodiments. The description of such corresponding parts is omitted herein.

As shown in FIG. 7, in the driving support apparatus according to the second embodiment, an obstacle sensor 31 adapted to detect an obstacle, such as a vehicle present in the imaging region A1 of the imaging camera 1, is added. The obstacle sensor 31 comprises a millimeter-wave radar, an ultrasonic sensor, or a laser radar provided in the periphery of the left-side corner part 11 of the front end portion of the vehicle. In a modification of the second embodiment, a detection means adapted to detect an obstacle in the imaging region A1 according to an image taken by the imaging camera 1 may be employed, instead of such an obstacle sensor 31. Such a detection means may be, for example, a device enabled to specify the position of an obstacle in the imaging region A1 according to a stereographic image and to recognition of the image, alternatively, a device enabled to specify the position of an obstacle in the imaging region A1 by analyzing the relation between the movement and the position of each image component in the imaging region A1, which are caused by the movement of the vehicle provided with the driving support apparatus.

The control portion 9 is adapted to change, in a case where an obstacle, such as a vehicle, is detected at one of positions in the imaging region A1 respectively corresponding to the positions of the pole images 13a to 13c in the supporting image 11, the display condition of the corresponding pole image 13a, 13b, or 13c (for example, adapted to change the color of the corresponding pole image or blink the corresponding pole image). Alternatively, the control portion 9 is adapted to display, in such a case, a predetermined warning on the supporting image 11.

Thus, according to this embodiment, advantages similar to those of the aforementioned first embodiment can be obtained. Also, this embodiment enables the driver to surely recognize the obstacle at one of the positions respectively corresponding to the pole images 13a to 13c.

Modifications

Hereinafter, apparatuses, in which techniques according to the first and second embodiments are applied to provision of supporting-images respectively corresponding to other directions, are described.

Figure 8:
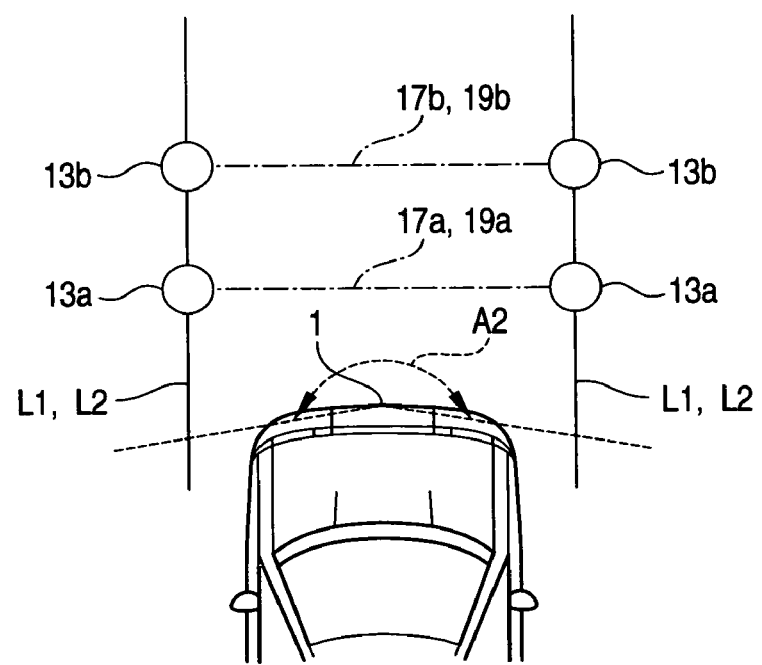
FIG. 8 is a diagram illustrating a modification of each of the driving support apparatuses respectively shown in FIGS. 1 and 7.
Figure 9:
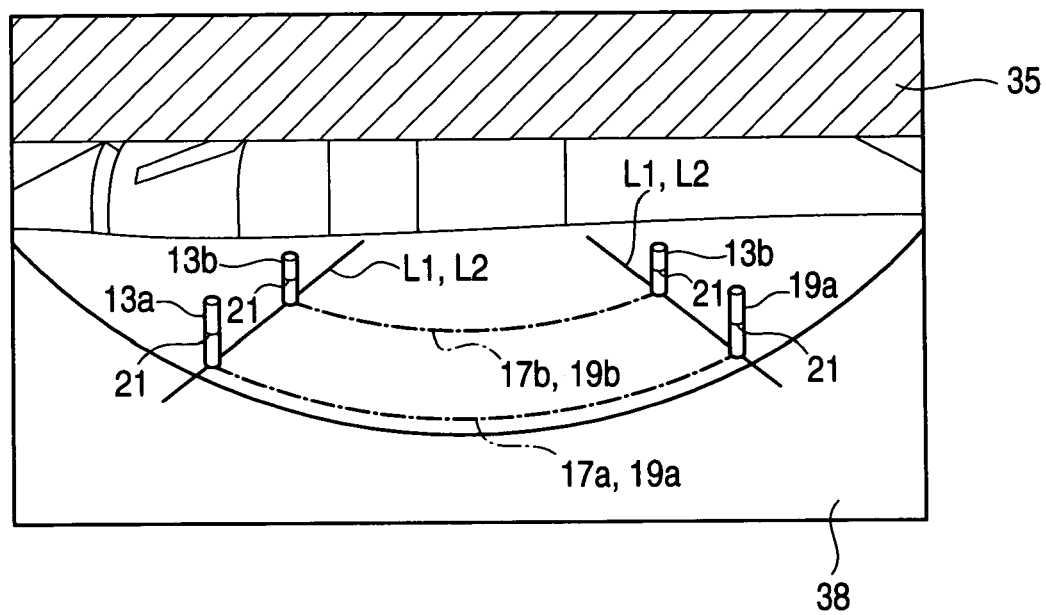
FIG. 9 is a diagram illustrating a supporting image displayed in the apparatus shown in FIG. 8.

In an apparatus shown in FIG. 8, the imaging camera 1 is installed at the central part of the front end portion of the vehicle and is adapted to take an image of an imaging region A2 provided frontwardly from or in front of the vehicle. Then, a supporting image 12 shown in FIG. 9 is formed of the taken image and various synthetic images. Subsequently, the supporting image 12 is displayed in the display portion 7. In the supporting image 12 shown in FIG. 9, the straight driving course image L1 and the steering-angle steered driving course image L2 are respectively displayed along both lateral sides of the driving course of the vehicle in which the driving support apparatus operates. Thus, two pole images 13a and 13b are displayed along each of the sides of the vehicle. Distance index images 17a and 19a are displayed on an imaginary line drawn between the pole images 13a and 13a, while distance index images 17b and 19b are displayed on an imaginary line drawn between the pole images 13b and 13b. Incidentally, because the steering-wheel steering angle is 0 in the supporting image 12 shown in FIG. 9, the straight driving course image L1 and the steering-angle steered driving course image L2 are displayed along each of lateral sides of the vehicle by being superposed. The distance index images 17a and 19a are displayed to be superposed, while those 17b and 19b are displayed to be superposed. Incidentally, a part (for example, a bumper) of the body of the vehicle is displayed in a lower part designated by reference numeral 33 in the supporting image 12. Additionally, an upper region designated by reference numeral 35 in a display screen shown in FIG. 9 is a black zone corresponding to an area placed outside the range of the taken image.

According to the modification shown in FIG. 8 can provide a supporting image corresponding to the front side of the vehicle.

Figure 10:
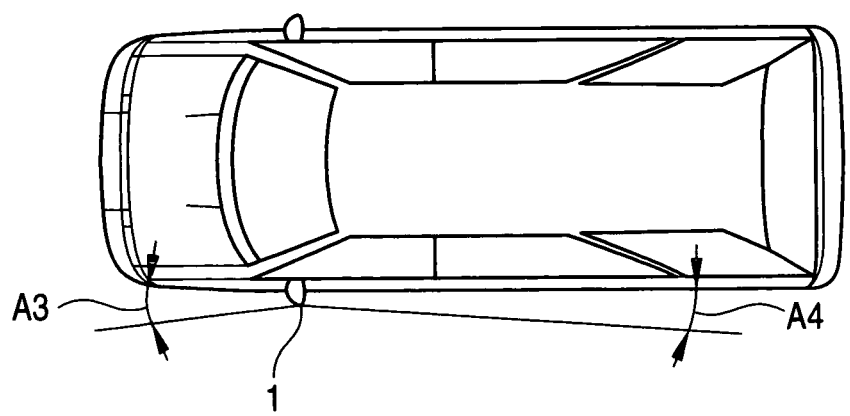
FIG. 10 is a diagram illustrating another modification of each of the driving support apparatuses respectively shown in FIGS. 1 and 7.

In an apparatus shown in FIG. 10, the imaging camera 1 is installed at a door mirror of the vehicle. Thus, the imaging camera is adapted to take images of imaging regions A3 and A4 provided by the side of the vehicle (for example, by the side of the assistant driver's seat). Then, a supporting image is formed by superposing synthetic images, which are similar to the aforementioned synthetic images L1, L2, 13a to 13c, 15, 17a, 17b, 19a, and 19b, onto each of the taken images. Subsequently, the supporting image is displayed in the display portion 7.

According to the modification shown in FIG. 10 can provide a supporting image corresponding to the side of the vehicle.

What is claimed is:

1. A driving support apparatus for supporting a driving by using an image with respect to a driver, comprising:
    an imaging member taking an image corresponding to a predetermined vehicle peripheral area;
    a steering angle detecting member detecting a steering-wheel steering angle of a vehicle;
    a display member being disposed in a vehicle interior to display the image; and
    a control member predicting a driving course of the vehicle according to the steering-wheel angle detected by the steering-angle detecting member, the control member synthesizing a predicted driving course image relating to the predicted driving course, the control member superposing the predicted driving course image at a corresponding position of the image taken by the imaging member, wherein
    the control member displays on the display member the image where at least one image, on which an index is marked at least at one height position, is superposed at least on the predicted driving course image and onto a side of the predicted driving course image while the control member displays the superposed image on the display member.

2. A driving support apparatus for supporting a driving by using an image with respect to a driver, comprising:
    an imaging member taking an image corresponding to a predetermined vehicle peripheral area;
    a steering angle detecting member detecting a steering-wheel steering angle of a vehicle;
    a display member being disposed in a vehicle interior to display the image; and
    a control member predicting a driving course of the vehicle according to the steering-wheel angle detected by the steering-angle detecting member, the control member synthesizing a predicted driving course image relating to the predicted driving course, the control member superposing the predicted driving course image at a corresponding position of the image taken by the imaging member, wherein
    the control member displays on the display member the image where at least one image, on which a color or a pattern is changed at a boundary that is provided at least at one height position, is superposed at least on the predicted driving course image and onto a side of the predicted driving course image while the control member displays the superposed image on the display member.

3. The driving support apparatus according to claim 1, wherein the image is displayed in a three-dimensional pole shape.

4. The driving support apparatus according to claim 1, further comprising:
    an input receiving member receiving operation input information for setting, wherein the control member receives through the input receiving member operation input information for changing a display mode of the predicted driving course image and a display mode of the image, and
    wherein the control member causes the operation input information to affect a display of the predicted driving course image and the image.

5. The driving support apparatus according to claim 4, wherein at least one of a pattern, a color, and a shape of the image is changeable according to the operation input information.

6. The driving support apparatus according to claim 4, wherein at least one of an up-down dimension of the image in the displayed image and the height position, at which the index or the boundary is provided, is changeable according to the operation input information.

7. The driving support apparatus according to claim 4, wherein positional relation of the vehicle with respect to the predicted driving course image and the image in the displayed image is changeable according to the operation input information.

8. The driving support apparatus according to claim 1, further comprising:
    an obstacle detecting member detecting an obstacle that is present in an imaging region of the imaging member,
    wherein, in a case where the obstacle detecting member detects that an obstacle is present at a position corresponding to the image, the control member changes a display condition of the image or causes the display member to display a predetermined warning.

9. The driving support apparatus according to claim 1, wherein the predicted driving course image includes:
    a steering-angle steered driving course image corresponding to the steering-wheel angle detected by the steering-angle detecting member; and
    a straight driving course image representing a predicted driving course in a case where the steering-wheel angle is zero.

10. The driving support apparatus according to claim 9, wherein the imaging member takes an image of an imaging region located obliquely frontwardly from an assistant driver's seat of the vehicle.

11. The driving support apparatus according to claim 9, wherein the imaging member takes an image of an imaging region located frontwardly from the vehicle.

12. The driving support apparatus according to claim 1, wherein the imaging member takes an image of an imaging region located laterally from the vehicle.

13. The driving support apparatus according to claim 3, wherein the image is formed by a plane where the image moves on a line extending along the predicted driving course according to the steering-wheel steering angle detected by the steering angle detecting member.

* * * * *